US008989360B2

(12) United States Patent
Couse et al.

(10) Patent No.: US 8,989,360 B2
(45) Date of Patent: Mar. 24, 2015

(54) HOST MODE FOR AN AUDIO CONFERENCE PHONE

(75) Inventors: Peter Francis Couse, Ottawa (CA); Anjie Wu, Kanata (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 711 days.

(21) Appl. No.: 12/932,764

(22) Filed: Mar. 4, 2011

(65) Prior Publication Data

US 2012/0224714 A1 Sep. 6, 2012

(51) Int. Cl.

*H04M 3/42* (2006.01)
*H04R 27/00* (2006.01)
*H04R 1/40* (2006.01)

(52) U.S. Cl.

CPC ................ *H04R 27/00* (2013.01); *H04R 1/406* (2013.01); *H04R 2227/009* (2013.01); *H04R 2430/20* (2013.01)
USPC .................... 379/202.01; 348/14.08; 370/260

(58) Field of Classification Search

USPC .................... 348/14.01–14.16; 370/259–271, 370/351–357; 704/270–278; 709/201–207, 709/217–248; 379/202.01
See application file for complete search history.

(56) References Cited

U.S. PATENT DOCUMENTS

| | | | | |
|---|---|---|---|---|
| 7,330,541 | B1 * | 2/2008 | Surazski et al. | 379/202.01 |
| 7,379,968 | B2 * | 5/2008 | Schuh | 709/204 |
| 7,518,631 | B2 * | 4/2009 | Hershey et al. | 348/14.1 |
| 7,724,891 | B2 * | 5/2010 | Beaucoup et al. | 379/406.02 |
| 8,144,633 | B2 * | 3/2012 | Yoakum et al. | 370/261 |
| 8,237,770 | B2 * | 8/2012 | Kenoyer et al. | 348/14.08 |
| 8,503,653 | B2 * | 8/2013 | Ahuja et al. | 379/202.01 |
| 8,520,822 | B2 * | 8/2013 | Gisby et al. | 379/202.01 |
| 2004/0052218 | A1 * | 3/2004 | Knappe | 370/260 |
| 2005/0058300 | A1 | 3/2005 | Suzuki et al. | |
| 2005/0094795 | A1 * | 5/2005 | Rambo | 379/202.01 |
| 2007/0067387 | A1 * | 3/2007 | Jain et al. | 709/204 |
| 2007/0098192 | A1 * | 5/2007 | Sipkema | 381/312 |
| 2007/0165834 | A1 * | 7/2007 | Redman et al. | 379/395 |
| 2008/0056457 | A1 * | 3/2008 | Hsu | 379/88.03 |
| 2008/0129816 | A1 * | 6/2008 | Mattila et al. | 348/14.08 |
| 2009/0002476 | A1 * | 1/2009 | Cutler | 348/14.01 |
| 2009/0110212 | A1 * | 4/2009 | Iwasaki | 381/92 |
| 2009/0210491 | A1 | 8/2009 | Thakkar et al. | |
| 2009/0214016 | A1 * | 8/2009 | O'Sullivan et al. | 379/202.01 |
| 2010/0066665 | A1 * | 3/2010 | Yoneda et al. | 345/156 |
| 2010/0245624 | A1 * | 9/2010 | Beaucoup | 348/231.4 |
| 2010/0253689 | A1 * | 10/2010 | Dinicola et al. | 345/467 |
| 2011/0038486 | A1 | 2/2011 | Beaucoup | |

* cited by examiner

*Primary Examiner* — Hemant Patel

(57) ABSTRACT

A system and method for receiving sound from a teleconference host at a teleconference phone is disclosed. The method comprises identifying a person to act as the teleconference host. A location of the identified teleconference host relative to the teleconference phone is determined. A plurality of microphones on the conference phone are configured as a beamforming receiver to receive an audio signal from the location of the teleconference host. Selected microphones from the plurality of microphones are biased to receive sound from the direction of the teleconference host relative to sound received from other directions.

19 Claims, 5 Drawing Sheets

HOST MODE FOR AN AUDIO CONFERENCE PHONE

BACKGROUND

Conference speaker telephones, commonly referred to as conference phones, are specialized telephones used to allow several people in a room to communicate with people at another location. Conference phones typically lack a handset. Rather, a conference phone usually includes a single speaker and a number of microphones that can receive audio from 360 degrees around the conference phone, enabling multiple people located around the conference phone to communicate via the conference phone.

A common problem with conference phones is the ability to pick up who is speaking when there is background noise in a room. The background noise can make it difficult for those located farthest from the conference phone to be heard. To help with this problem, conference phones have been designed with microphones having the ability to be configured to receive audio in a specific direction through the use of beamforming, which focuses the audio received by the microphones in a selected direction.

For instance, the microphones in the conference phone may be configured to receive audio from the person speaking the loudest, while attenuating sound that is received by microphones directed in other directions throughout the room. This can minimize the pickup of background noise while maximizing the audio reception of the person speaking. The persons at the other end of the telephone connection (i.e. other location) that are receiving the audio from the conference call primarily hear the speaker with limited background noise.

Focusing microphones to receive the audio from the person speaking the loudest, while reducing the reception of background noise, enables those at the other location to hear the person speaking. However, it does not place any priority on who is speaking. Everyone is treated equally. This can make it difficult for the host of the teleconference to be heard when he or she speaks, thereby reducing the effectiveness of the conference call.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
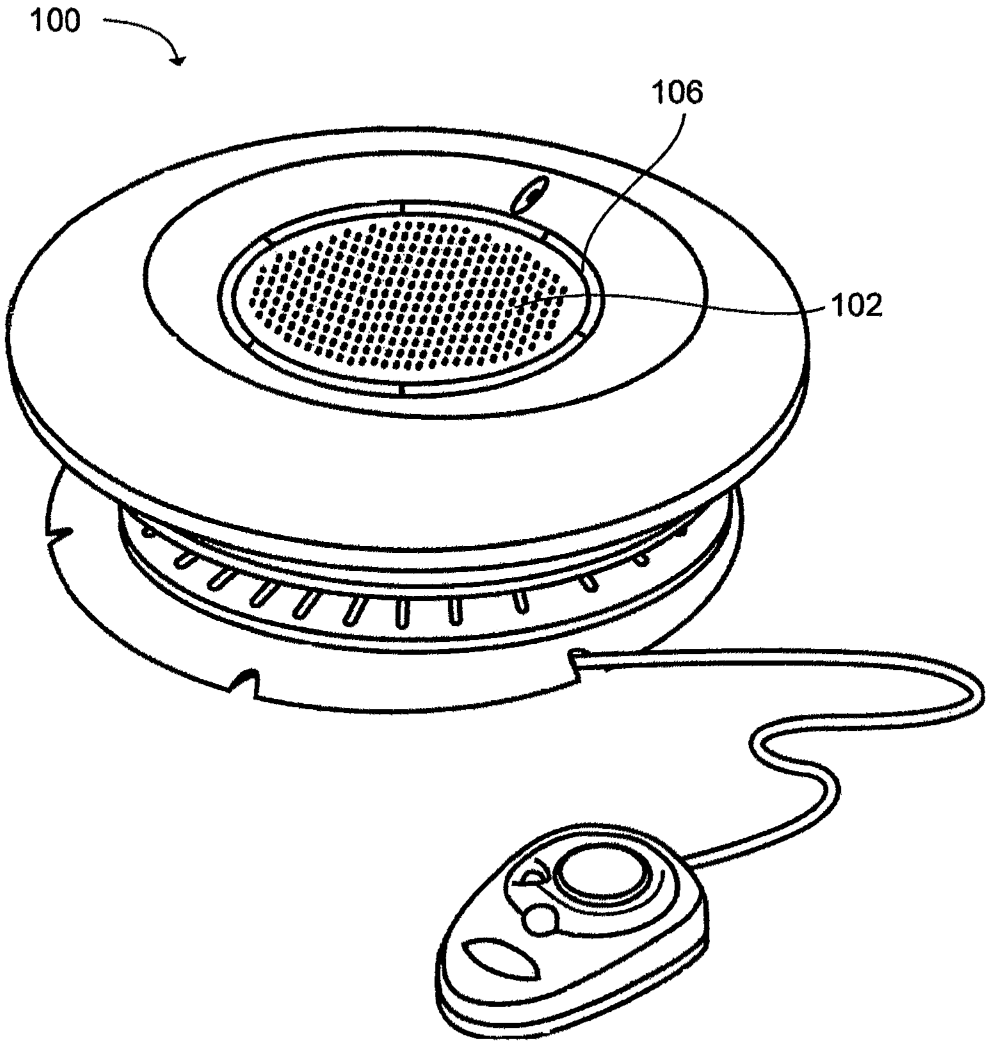
FIG. 1 illustrates an example diagram of a teleconference speaker phone in accordance with one embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

In order to pick up sound in a specific direction, a conference speaker telephone, referred to herein as a conference phone, can be configured to operate using a beamforming algorithm. The beamforming algorithm can function similarly to beamforming algorithms designed to transmit radio frequency signals in a specific direction. Beamforming algorithms are also used in audio speaker arrays to transmit audio in a specific direction. However, beamforming algorithms used in a conference phone are used to configure a plurality of microphones to receive an audio signal, rather than transmitting a radio frequency or audio signal.

A typical beamforming algorithm continuously analyzes the audio input levels of microphones in a microphone array located in the conference phone to determine which microphone receives the highest amplitude audio signal. The microphone receiving the highest amplitude audio signal is typically the microphone closest to and/or directed at the loudest audio source received at the conference phone. This information is used to configure the microphones to receive the audio from the direction of the loudest audio source. The array of microphones are configured to receive and amplify sounds from this direction, while attenuating sounds from other directions.

Conference calls are often run by a host, such as the person who has called the meeting. In many cases, this person should have a higher priority when they speak during a conference call versus the other participants in the room. For example, a teleconference may be hosted by a senior manager and other participants in the room that are subordinate to the manager. In accordance with one embodiment of the present invention, it may be desirable that the senior manager is given a higher priority over other participants in the teleconference. Accordingly, the microphones in a conference speaker telephone can be configured to focus on the senior manager whenever he or she speaks during the teleconference. This would allow participant(s) in the teleconference that are at the other end of the telephone call to hear the senior manager even when another person at the senior manager's location is speaking louder than the senior manager.

In accordance with one embodiment of the present invention, a conference speaker telephone is configured to allow a user to identify a conference call host. Once identified, the reception of audio from the direction of the conference call host can be prioritized over audio received from other directions. Audio received from the direction of the conference call host can be given a higher priority over other audio beams within a beamforming algorithm to allow the participants at the other end of the telephone call to hear the conference call host over other participants. When the conference call host is not communicating then the conference speaker telephone can be configured to receive audio from other participants positioned around the conference phone.

FIG. 1 provides one example of a conference speaker telephone 100. In this example, the conference speaker telephone is substantially round with a plurality of microphones laid out in a ring around a center speaker 102. The phone includes a light bar 106 surrounding the speaker 102. The light bar is divided into a plurality of sections representing audio directions from which the microphones are configured to receive audio. In this example there are six different sections. Each section of the light bar can individually light up when the microphones are configured to receive audio in the direction of that section, thereby displaying the direction in which the plurality of microphones are configured to directionally receive a beamforming audio signal.

While the conference speaker telephone illustrated in FIG. 1 is round, additional shapes are considered within the scope of the present application as well. For instance, the conference speaker telephone may have three, four, six, or more arms directed outward from a center speaker, with each arm allowing sound to be directionally received in the direction of the arm. The conference speaker telephone may be shaped as an oval, a triangle, a square, a rectangle, a pentagon, hexagon, heptagon, octagon, and so forth. The conference speaker telephone can have any shape that enables multiple microphones to be oriented to pick up audio from multiple directions. The microphones can also be configured to minimize sound from other directions. In one embodiment, the conference speaker telephone can be shaped to receive audio over a full 360 degrees around the conference phone.

As previously discussed, conference speaker telephones are typically configured to receive sound from the direction having the loudest audio. So if a speaker (or background noise) is the loudest in a direction with respect to a specific section, the associated section of the light bar 106 will illuminate and the microphones in the conference phone are configured to receive the audio in the direction of that section. In one embodiment, the gain of certain microphones in the conference phone can be enhanced, while the gain of other microphone(s) can be decreased to reduce the background noise.

A variety of different types of beamforming algorithms can be used to configure the microphones in a speakerphone to receive and amplify the sound in a particular direction. Beamforming is a signal processing technique wherein the signals from the plurality of microphones are adjusted in amplitude and phase to either amplify or attenuate received audio signals. Beamforming can take advantage of the constructive and destructive interference to change the directionality of the fixed array of microphones in the conference phone.

Figure 2:
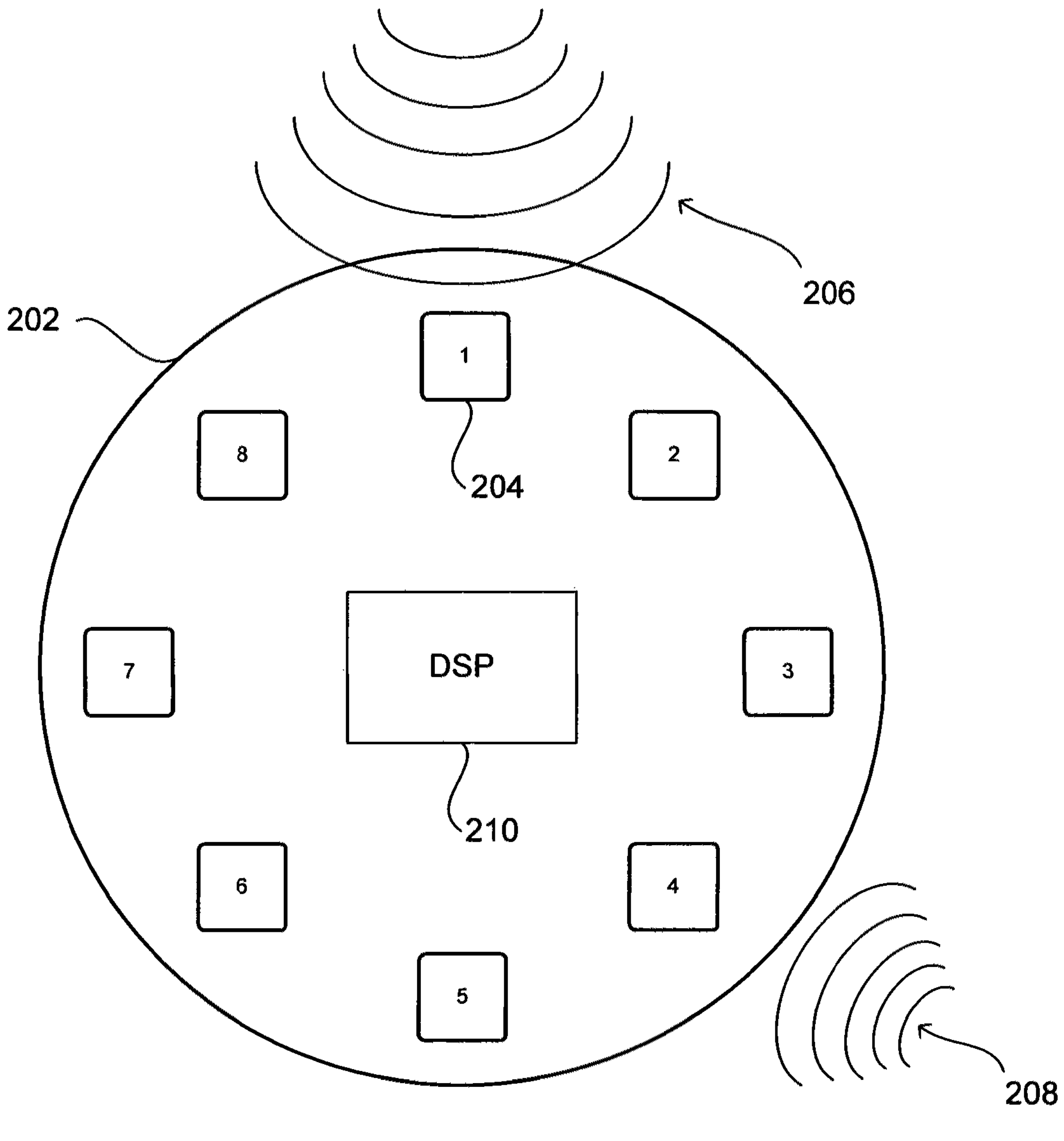
FIG. 2 illustrates an example of a teleconference speakerphone having eight microphones in accordance with one embodiment of the present invention.

One simplified example is illustrated in FIG. 2. In this example, a conference speaker telephone 202 is illustrated having eight microphones 204. The conference phone 202 may actually have dozens, or even hundreds of separate microphones. A sound wave 206 emitted from a selected direction will first be received by the microphone located closest to the audio source. The sound wave may be audio emitted by a person speaking. In this example, the sound wave will first be detected by microphone 1. The sound wave will continue to progress. Assuming the sound wave continues, it will then be detected by microphones 2 and 8, then microphones 3 and 7, then 6 and 4, and last by microphone 5. Thus, the electronic signals created by each of the microphones that correspond with the detected sound wave will be created at different times. In order to amplify the sound wave 206, the phase of each of the microphones can be adjusted such that the signals can be combined. When the signals are substantially in phase, the detected signals will add constructively, allowing the detected sound wave 206 to be amplified.

Background noise may be received at the conference phone 202 by the microphones 204 from other directions. For instance, sound wave 208 may be background noise. The background noise may have a lower amplitude than sound wave 206. The background noise will also be detected sequentially by each of the microphones. The phase of the microphone signals associated with the background noise can be adjusted to be out of phase. For instance, the microphones may be adjusted such that they are 180 degrees out of phase. The out of phase signals can then be added, thereby resulting in destructive interference with a significant reduction in the amplitude of the background noise sound wave 208.

In addition to adjusting the phase of the signals detected by each of the microphones 204, the gain (signal amplification) of each microphone can also be adjusted. For instance, when the audio with the greatest amplitude is detected, the gain of microphones in that area can be increased. Similarly, the gain of microphones on the opposite side of the conference phone 202 can be decreased.

The conference phone 202 can include a microprocessor, such as a field programmable gate array (FPGA), digital signal processor (DSP), or similar type of processor. A DSP 210 is used in this example. The output of each microphone can be converted to a digital signal (using an analog to digital converter) and sent to DSP 210. The DSP can use a beamforming algorithm to alter the digital signals from the microphones to form a spatial filter such that sound from a selected direction is amplified, while sound from other directions is attenuated. Common types of beamforming algorithms include the delay and sum beamforming algorithm, the Bartlett beamforming algorithm, the superdirective beamforming algorithm, the least square beamforming algorithm, and the minimum variance distortionless response (MVDR) beamforming algorithm. Any type of beamforming algorithm may be used that can enable sound to be detected and amplified from a selected direction while minimizing sound from other, unwanted directions.

As previously discussed, one of the challenges of using a conference speaker telephone is minimizing background noise while enabling multiple parties to speak. For instance, if one person is giving a presentation and the conference phone is directed to detect the audio from the presentation, another person sitting at another location around the conference phone that adds a comment or asks a question may not be detected by the conference phone. More specifically, the conference phone may minimize the audio output by the second speaker, assuming it is background noise. Thus, the person(s) on the other side of the telephone call may not be able to hear the second person speaking. This can be especially challenging if the second person is the teleconference call chair or another senior person.

To overcome these limitations, the location of the conference call chair person can be identified relative to the conference speaker telephone. The conference speaker telephone can then be configured to detect audio coming from the direction of the conference chair, even when another person is speaking more loudly. This enables the conference chair to add input at any point throughout the conference call that can be heard by the person(s) on the other end of the telephone call.

There are a number of different ways of identifying the location of the conference call chair relative to the conference speaker telephone. In one embodiment, the conference phone can include a selected location that can be configured to receive audio from the teleconference host. For instance, one of the six sections in the conference phone 100 in FIG. 1 can be configured to be set to receive audio from a teleconference host. This section can be referred to as the host section. The teleconference host can rotate the phone such that the host section is directed toward the person hosting the conference call.

The conference phone 100 can be configured to allow a host to activate or deactivate a "host mode" in which the host section can be configured to detect audio from the direction of the host section that is greater than a selected threshold. The threshold may be set such that it is approximately equal to a typical voice conversation amplitude from the teleconference host. This threshold may be factory set or may be adjustable by a user. The teleconference host can activate the "host mode" via a button or graphical user interface on the conference phone, or via a computing device in communication with the conference phone.

When the host mode is activated then audio can be detected in the direction of the host section that is greater than the selected threshold. This audio can be amplified and communicated via the telephony call. In one embodiment, when the host mode is activated and audio is detected having an amplitude above the selected threshold level from the direction of the host section, the conference phone can be configured to receive audio from this direction, while minimizing audio that is received from any other direction. The result to the person(s) on the other side of the telephone call will be the first speaker is interrupted whenever the designated teleconference host speaks.

Alternatively, the conference phone can be configured to continue to receive audio from a first speaker, or audio from a first direction, and add the audio received from the direction of the host section when the host mode is activated and the audio amplitude from the host direction is greater than the selected threshold. This can result in the person(s) on the other side of the telephone call able to hear both a first speaker (and/or audio from a first direction) and the host speaker (and/or audio from a direction of the teleconference host) simultaneously, as would occur if the person(s) were physically present at the location of the conference phone.

In another embodiment, the direction of the teleconference host can be identified electronically. Rather than using a teleconference speaker telephone that is configured to provide the host mode in a single direction, a user or host can electronically identify the location of the host relative to the conference phone. For instance, the conference phone can be configured to enable the user to depress a button on the conference phone to identify a location of the host. Alternatively, the conference phone may display, or be electronically connected with, a graphical user interface that can be configured to select a direction relative to the conference phone in which the host will be located. When the host mode is activated, the conference phone can then be configured to prioritize audio detected from the direction of the teleconference host, as previously discussed.

In another embodiment, the location of the teleconference host relative to the conference phone can be dynamically determined. The ability to dynamically determine the location of the teleconference host provides a number of advantages. The teleconference host can then be allowed to move around during a conference call. For instance, the teleconference host can initiate a conference call from a seat at a table. The teleconference host can then move to a white board or another location in a conference room. The conference phone can be configured to identify whenever a teleconference host is speaking and prioritize audio that is detected from the direction of the teleconference host, as previously discussed.

The location of the teleconference host relative to the conference phone can be dynamically determined a number of different ways. For instance, in one embodiment, the location of the teleconference host can be determined based on voice identification. The teleconference host can provide a speech sample to the conference phone. The speech sample can be used to recognize when the teleconference host is speaking. The location of the teleconference host can be determined based on which microphone(s) first detect the audio from the teleconference host. When the location of the teleconference host changes, the conference phone can be reconfigured to provide preferential detection of audio from the updated location of the conference phone.

In another embodiment, the teleconference host can use a portable microphone that is coupled to the conference phone via a wired or wireless connection. The wireless connection can be accomplished via an industry standard such as Bluetooth®, IEEE 802.11, DECT, and the like. The portable microphone can be used to not only receive audio from the teleconference host, as he or she moves around the room, but can also be used to determine a distance of the teleconference host relative to the conference phone. A location of the teleconference host can be determined based on which microphone(s) first detect the audio, as previously discussed.

For example, the distance of the teleconference host relative to the conference phone can be determined based on a time difference of audio received at the portable microphone relative to audio received at a first microphone at the conference phone. The sound at the portable microphone is converted to an electronic signal and communicated via a wired or wireless signal to the conference phone. The wired or wireless signals will travel at near the speed of light. However, the audio signal from the teleconference host will travel at the speed of sound to the microphones at the conference phone. The difference in timing between the reception of the wireless signal relative to the reception of the slower audio signal can be used to determine the distance of the teleconference host. The information obtained regarding the distance of the teleconference host from the conference phone can then be used to adjust a gain and/or sensitivity of the microphones when directionally receiving audio from the teleconference host. This will be discussed more fully below.

Host Mode for Conference Phone

To implement the host mode in a conference phone having a plurality of microphones, the gain of one or more of the microphones can be adjusted with respect to a direction of the teleconference host. This may be accomplished using either analog or digital circuits.

Figure 3:
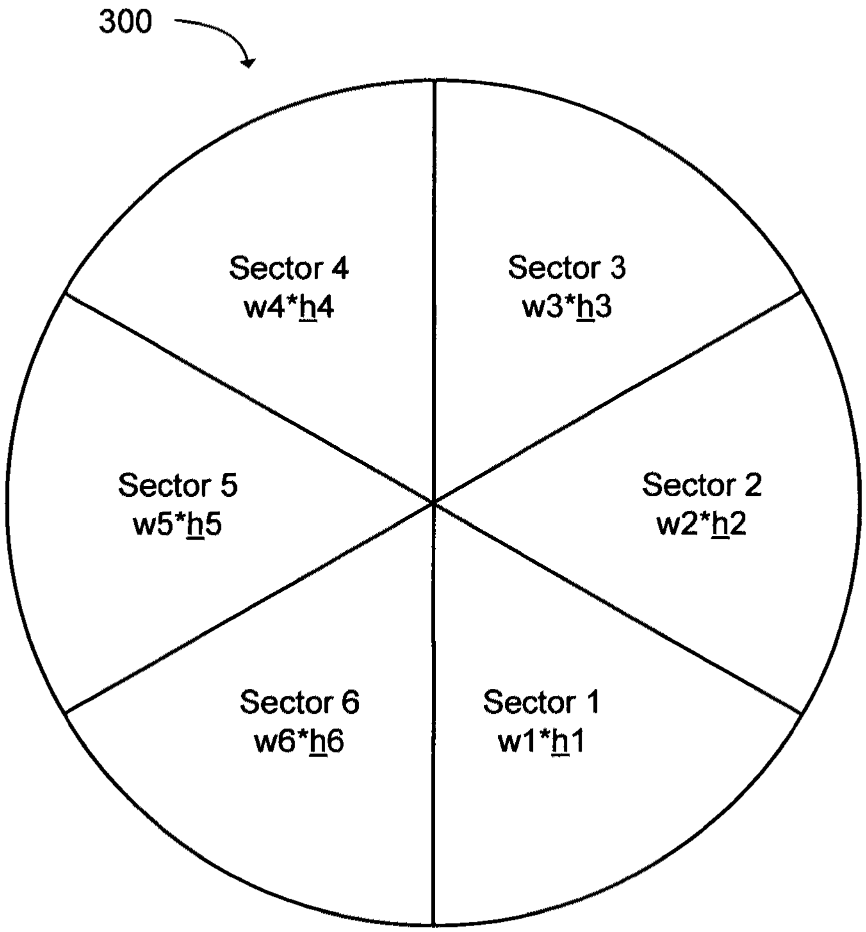
FIG. 3 illustrates an example of a teleconference speakerphone having a plurality of sections in accordance with an embodiment of the present invention.

In one example embodiment, the conference phone can be divided into sectors, as illustrated in FIG. 3. FIG. 3 shows the conference phone divided into six sectors. The conference phone may have more or less than six sectors. Each sector can include one or more microphones. Each microphone may be connected to a DSP, or equivalent. Additional electronic circuitry may also be involved, such as an amplifier used to adjust a gain of the output of each microphone. The output of the amplifier can be sent to an analog to digital converter, which can then be sent to the DSP. The output of each microphone can be adjusted using a beamforming algorithm, such as the following equations:

$$BF1(t) = \sum_{i=1}^{N} (\underline{h}_{1i} * \underline{x}_{1i})(t) \quad (1)$$

$$BF2(t) = \sum_{i=1}^{N} (\underline{h}_{2i} * \underline{x}_{2i})(t)$$

$$K$$

$$BF6(t) = \sum_{i=1}^{N} (\underline{h}_{6i} * \underline{x}_{6i})(t)$$

where t is time, N is a number of coefficients in a digital filter, $h_{1i}$ is a digital filter coefficient in the time domain for a microphone in the first sector, and $x_{1i}$ is a signal from the microphone in the first sector. As shown in equation 1, a calculation can be made for each of the microphones in each sector of the conference phone. In one embodiment, a digital filter such as a finite impulse response (FIR) filter can be used to weight the incoming signal filter coefficients to create a spatial filter to amplify desired audio signals and attenuate undesired audio signals, as previously discussed. The example above is not intended to be limiting. There are a number of algorithms and filtering means which can be used to spatially filter the microphones to obtain desired audio signals at the conference phone. Once the desired audio signal has been obtained, it can be transmitted to one or more parties via a public switched telephone network (PSTN), or via a digitized signal such as a voice over internet protocol (VOIP) signal or another type of packet based communication.

In accordance with one embodiment, the "host mode" can be implemented by weighting the coefficient values for the microphones in each sector of the conference phone, as shown in FIG. 3. For example, a weight value "w" can be used to result in a preferential treatment of the audio received by microphones in a certain sector of the conference phone. Thus, equation 1 becomes 1' as follows:

$$BF1(t) = w_1 \sum_{i=1}^{N} (\underline{h}_{1i} * \underline{x}_{1i})(t) \quad (1')$$

$$BF2(t) = w_2 \sum_{i=1}^{N} (\underline{h}_{2i} * \underline{x}_{2i})(t)$$

$$K$$

$$BF6(t) = w_6 \sum_{i=1}^{N} (\underline{h}_{6i} * \underline{x}_{6i})(t)$$

The weight value of the weight in each sector can initially be set to a selected unitary value to provide equal weighting to each sector. In one example, the weight value of "w" can be set to one (1) by default.

One of the sectors can then be identified as being closest to the teleconference host, and thereby designated as a host mode sector. The weight of the host mode sector can then be increased relative to the weight factors in other sectors based on a number of factors. One factor is the predetermined audio threshold at which audio will be detected and communicated via the conference call. An increased weight value of "w" can enable audio with a lower amplitude to be detected.

In one embodiment, the weight factor for the host mode sector can be manually controlled. The weight factor may be manually controlled using physical controls located on the conference phone, such as volume up and volume down buttons, a sliding control, a graphical user interface control in communication with the conference phone, and the like. If the teleconference host travels further from the conference phone, the weight value may need to be increased to allow lower amplitude audio to be detected. As the teleconference host travels closer to the conference phone, the weight value may need to be decreased so that inadvertent background noise in the direction of the teleconference host is not detected and transmitted.

In another embodiment, the weight factor for the host mode sector can be controlled automatically be detecting a distance of the teleconference host from the conference phone, as previously discussed, and adjusting the weight factor based on the distance. Alternatively, a combination of automatic adjustments based on distance of the teleconference host to the conference phone and other factors such as the amount of background noise can be combined with the ability to manually adjust the weight factor for the host sector.

In addition, the weight factors of microphones in other sectors may. also be increased or decreased as desired. For instance, if there is a relatively high background noise level in one direction, the weight factor for one or more sector(s) in that direction may be decreased to be less than 1, thereby attenuating the sound received from that direction.

Figure 4:
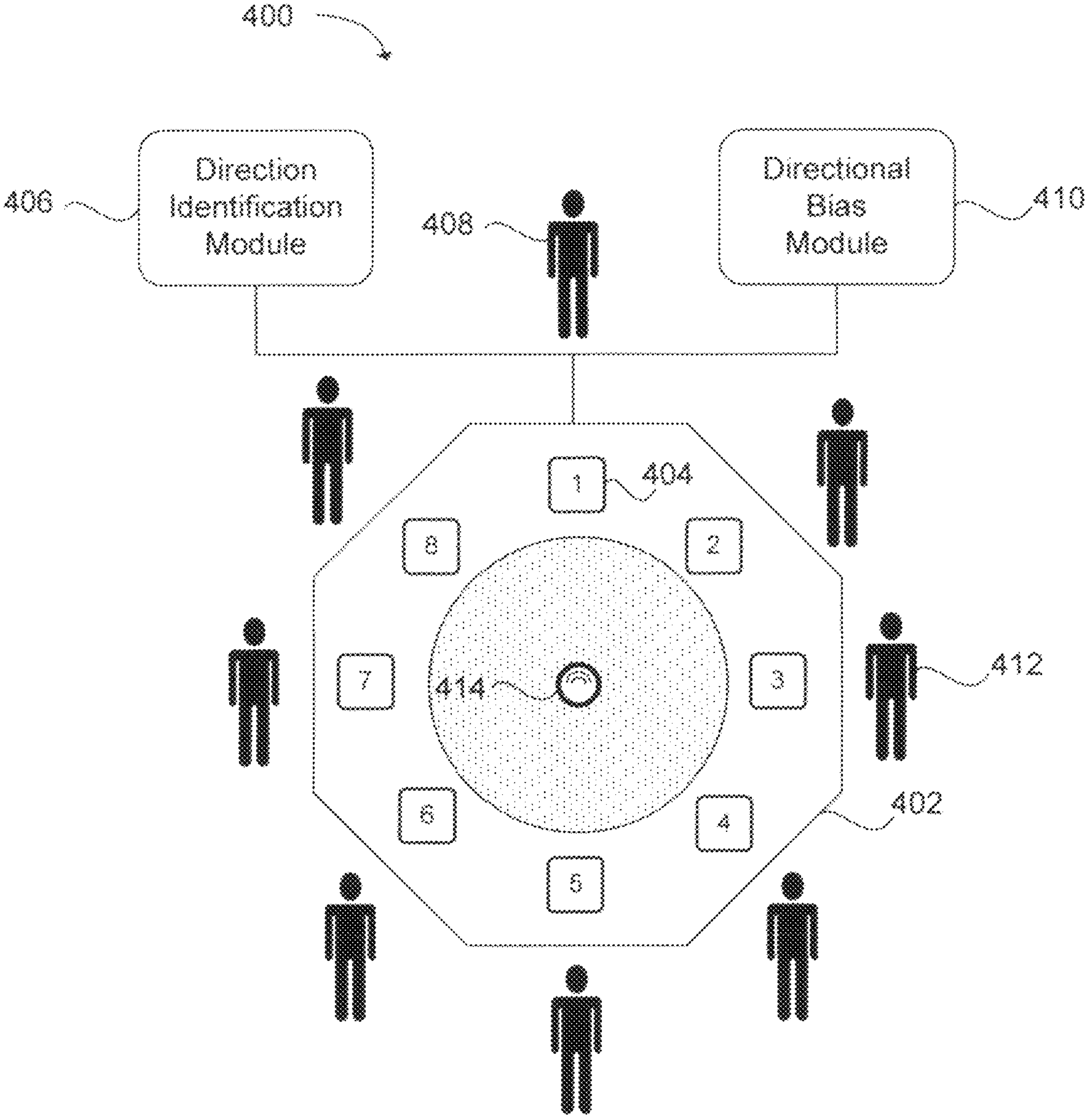
FIG. 4 illustrates an example block diagram of a system for receiving sound on a teleconference phone from a teleconference host in accordance with an embodiment of the present invention.

In another embodiment, a system 400 for receiving sound on a teleconference phone from a teleconference host is disclosed, as illustrated in an example block diagram provided in FIG. 4. The block diagram is not drawn to scale.

The system 400 comprises a teleconference phone 402 having a plurality of microphones 404 configured as a beamforming receiver to receive an audio signal from a selected direction. A direction identification module 406 is electronically coupled to the teleconference phone to allow a user to identify a direction of the teleconference host 408 to be identified relative to the teleconference phone. The teleconference host can be any person selected to host the teleconference call. The direction of the teleconference host relative to the teleconference phone can be identified by physically moving the teleconference phone, electronically selecting a location on the teleconference phone near the teleconference host, or electronically identifying a location of the teleconference host relative to the microphones on the teleconference phone, as previously discussed.

A directional bias module 410 is configured to bias selected microphones from the plurality of microphones 404 to receive an audio signal from the identified direction of the teleconference host 408 relative to audio signals from other directions. In this example, the teleconference host 408 is located in a direction relative to microphone 1 of the teleconference phone 402. The microphones 404 can be configured to receive audio from the direction of the teleconference host. Selected microphones can be biased by weighting the microphones to be more or less sensitive, as previously discussed. This enables audio from the direction of the teleconference host to be detected and communicated via the conference phone whenever the teleconference host speaks or produces other types of audio, thereby enabling the teleconference host to control the meeting.

While the conference phone 402 is configured to be biased to detect and receive audio from the direction of the teleconference host, it is typically not configured to be biased in another direction. For instance, when an attendee 412 of the teleconference wants to speak, he or she must wait for everyone else to quit speaking in order to be detected by the conference phone. However, by the time this occurs, the attendee's comment may no longer be relevant. Accordingly, the conference phone can also include a comment button 414. The comment button may be a physical button or switch, or a virtual button provided by a graphical user interface in communication with the teleconference phone.

The comment button 414 can produce an audio tone used to indicate when someone has a comment or question. The audio tone can inform the speaker and/or the teleconference host that someone has a question. The speaker and teleconference host can then allow the attendee 412 to ask the question. If no one else (including host 408) is speaking, then the conference phone is configured to receive audio from another speaker, such as the attendee 412. The audio from the attendee 412 will then be communicated to the other party or parties involved in the teleconference, thereby enabling the attendee to comment or question in a timely manner.

Figure 5:
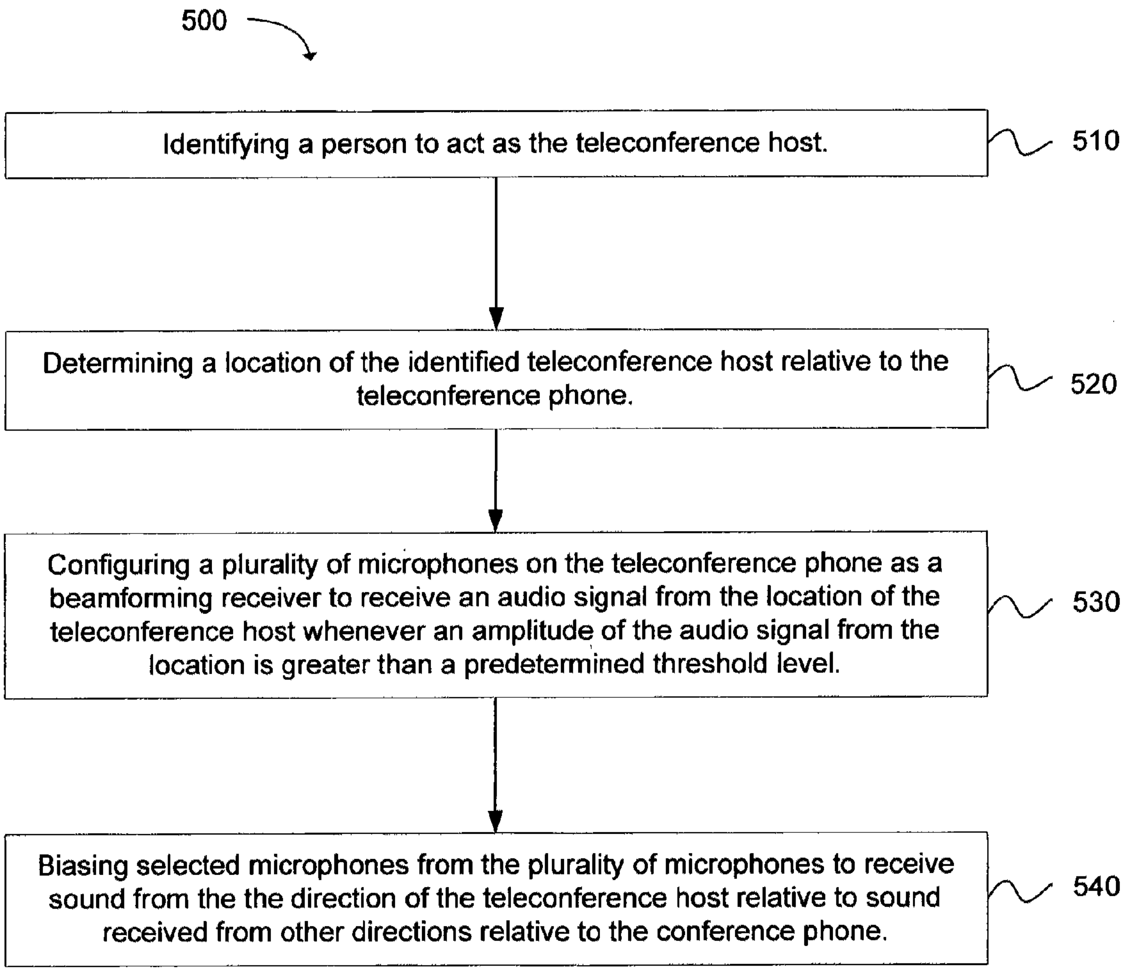
FIG. 5 depicts a flow chart of a method for receiving sound on a teleconference phone from a teleconference host in accordance with an embodiment of the present invention.

In another embodiment, a method 500 for receiving sound at a teleconference phone from a teleconference host is disclosed, as depicted in the flow chart of FIG. 5. The method comprises identifying 510 a person to act as the teleconference host. A location of the indentified teleconference host can be determined 520 relative to the teleconference phone. A plurality of microphones on the teleconference phone are configured 530 as a beamforming receiver to receive an audio signal from the location of the teleconference host whenever the audio signal from the location has an amplitude that is greater than a predetermined threshold level. Selected microphones from the plurality of microphones are biased 540 to receive sound from the teleconference host relative to sound from other directions relative to the teleconference phone.

As previously discussed, identifying the location of the teleconference host can involve physically moving a predetermined location on the conference phone in a direction towards the teleconference host. Alternatively, a location of the identified teleconference host relative to the conference phone can be identified electronically. For instance, a button, slider, or a graphical user interface can be used to electronically identify a location of the teleconference host relative to the teleconference phone. In another embodiment, the location of the identified teleconference host can be determined using voice identification, as previously discussed.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for receiving sound at a teleconference phone from a teleconference host, comprising:

identifying a person to act as the teleconference host;

receiving a speech sample of the teleconference host;

using the speech sample to recognize that the teleconference host is speaking and determining a distance of the teleconference host relative to the teleconference phone;

when the teleconference host is speaking, prioritizing the reception of audio from the direction of the teleconference host over audio received from other directions by giving audio received from the direction of the teleconference host a higher priority over other audio beams within a beamforming algorithm; and when the teleconference host is not speaking, receiving audio from other participants positioned around the teleconference phone.

2. The method of claim 1, wherein determining a distance of the identified teleconference host further comprises physically moving a predetermined location on the teleconference phone in a direction towards the teleconference host.

3. The method of claim 1, wherein determining a distance of the identified teleconference host further comprises electronically identifying the distance of the teleconference host relative to the teleconference phone.

4. The method of claim 1, wherein configuring the plurality of microphones on the teleconference phone as a beamforming receiver further comprises applying a finite impulse response filter to each of the plurality of microphones to form a spatial filter.

5. The method of claim 1, further comprising giving audio received from the direction of the teleconference host a higher priority over other audio beams by increasing a sensitivity of microphones to increase a reception of audio signals received from the direction of the teleconference host.

6. The method of claim 1, further comprising giving audio received from the direction of the teleconference host a higher priority over other audio beams by decreasing a sensitivity of microphones to decrease a reception of background noise received from other directions than the direction of the teleconference host.

7. A system for receiving sound from a teleconference host on a teleconference phone, comprising:

a teleconference phone having a plurality of microphones configured as a beamforming receiver .to receive an audio signal from a selected direction the teleconference phone being configured to receive a speech sample of the teleconference host and to use the speech sample to recognize that the teleconference host is speaking;

a direction identification module electronically coupled to the teleconference phone to enable a direction and a distance of the teleconference host relative to the teleconference phone; and a directional bias module configured when the teleconference host is speaking, to prioritize the reception of audio from the direction of the teleconference host over audio received from other directions by giving audio received from the direction of the teleconference host a higher priority over other audio beams within a beamforming algorithm; and configured, when the teleconference host is not speaking, to receive audio from other participants positioned around the teleconference phone.

8. The system of claim 7, wherein the direction identification module configures a selected location on the teleconference phone to be biased to receive the audio signal in the direction of the selected location on the teleconference phone and the selected location is physically turned towards the teleconference host.

9. The system of claim 7, wherein a location identification module is configured to identify a direction of the teleconference host relative to the teleconference phone using voice identification.

10. The system of claim 7, wherein the directional bias module is configured to bias the plurality of microphones to receive an audio signal from the identified direction of the teleconference host by applying a bias to selected microphones of the plurality of microphones that are selected using a beamforming algorithm selected from the group consisting of a delay and sum beamforming algorithm, a Bartlett beamforming algorithm, a superdirective beamforming algorithm, a least square beamforming algorithm, and a minimum variance distortionless response (MVDR) beamforming algorithm.

11. The system of claim 7, wherein the directional bias module is configured to increasing a sensitivity of selected microphones to increase a reception of audio signals received from the identified direction of the teleconference host.

12. The system of claim 7, wherein the directional bias module is configured to decrease a sensitivity of selected microphones to decrease a reception of audio signals received from directions other than the identified direction of the teleconference host.

13. The system of claim 7, further comprising a comment button configured to produce an audio tone when the comment button is activated to indicate that a conference attendee has at least one of a question and a comment.

14. A computer program product, comprising a computer usable medium having a computer readable program code embodied therein, said computer readable program code adapted to be executed to implement a method for receiving sound at a teleconference phone from a teleconference host, comprising:

identifying a person to act as the teleconference host;

receiving a speech sample of the teleconference host;

using the speech sample to recognize that the teleconference host is speaking and determining a distance of the teleconference host relative to the teleconference phone;

when the teleconference host is speaking, prioritizing the reception of audio from the direction of the teleconference host over audio received from other directions by giving audio received from the direction of the teleconference host a higher priority over other audio beams within a beamforming algorithm; and when the teleconference host is not speaking, receiving audio from other participants positioned around the teleconference phone.

15. The computer program product of claim 14, wherein the computer readable program code is adapted to be executed to implement identifying by a direction of the selected teleconference host further comprises electronically identifying the direction of the teleconference host relative to the teleconference phone.

16. The computer program product of claim 14, wherein the computer readable program code is adapted to be executed to implement identifying by a direction of the selected teleconference host further comprises:

physically moving a predetermined location on the teleconference phone in a direction towards the teleconference host.

17. The method of claim 1, wherein determining a distance of the teleconference host relative to the teleconference phone further comprises reconfiguring the conference phone to provide preferential detection of audio from an updated location of the conference phone when a location of the teleconference host changes.

18. The system of claim 7, wherein the directional bias module configured is configured to prioritize the reception of audio from the direction of the teleconference host over audio received from other directions by reconfiguring the conference phone to provide preferential detection of audio from an updated location of the conference phone when a location of the teleconference host changes.

19. The computer program product of claim 14, wherein the computer readable program code is adapted to be executed to implement determining a distance of the teleconference host relative to the teleconference phone further by reconfiguring the conference phone to provide preferential detection of audio from an updated location of the conference phone when a location of the teleconference host changes.

* * * * *